United States Patent
Ludman

3,750,048
July 31, 1973

[54] WINDOW FOR HIGH POWER GASEOUS LASERS

[75] Inventor: Jacques E. Ludman, Westford, Mass.

[73] Assignee: The United States of America as represented by the Secretary of the United States Air Force, Washington, D.C.

[22] Filed: May 17, 1972

[21] Appl. No.: 254,141

[52] U.S. Cl. .................................. 331/94.5, 350/199
[51] Int. Cl. ............................................. H01s 3/08
[58] Field of Search ..................... 331/94.5; 350/199

[56] References Cited
UNITED STATES PATENTS

| | | | |
|---|---|---|---|
| 3,402,364 | 9/1968 | De Lang | 331/94.5 |
| 3,426,294 | 2/1969 | Koester | 331/94.5 |
| 3,433,960 | 3/1969 | Minoti | 250/199 |
| 3,501,323 | 11/1970 | Stewart et al. | 350/199 X |
| 3,681,709 | 8/1972 | Brown | 331/94.5 |

OTHER PUBLICATIONS

Hitachi KK, Pub. No. 24472/71, filed Sept. 27, 1968. (Japanese Patent).

*Primary Examiner*—Ronald L. Wibert
*Assistant Examiner*—R. J. Webster
*Attorney*—Harry A. Herbert, Jr. et al.

[57] ABSTRACT

In a gas laser capable of ultra high power, a cylindrical mirror mounted to receive the laser beam, diverge it, thereby lowering the power density. A cylindrical lens, acts as the seal and window, receives and transmits the beam causing it to reform outside of the container without the need of further optics.

2 Claims, 2 Drawing Figures

WINDOW FOR HIGH POWER GASEOUS LASERS

BACKGROUND OF THE INVENTION

This invention relates generally to high power gas lasers and more specifically to a window and associated structure that will allow the transmission of a laser beam having an ultra high power density without destroying the window and with minimum thermal lensing.

Gas lasers having a high power density are currently limited by the optical equipment associated with the system. With the gas laser it is essential to provide some means of confining the gaseous lasing medium, ordinarily this confining means is a box like device, either cylindrical, cubical or rectilinear having a window at opposing ends. When an ultra high power density laser beam is transmitted through an ordinary window the effect of the beam on the window ranges from simple lens distortion on the one hand to the explosive destruction of the window on the other.

Existing materials, having the capability of handling ultra high power laser beams, have low environmental resistance which eliminates their use as a container window. Similarly, materials having satisfactory structural and resistance properties do not handle the high power beam well.

SUMMARY OF THE INVENTION

Where suitable window materials are not available another means of solving the problem is to lower the power density of the beam as it passes through the window. This invention provides a means for reducing the power density of a laser beam and uniquely reforming the beam in a manner that avoids the necessity of providing another optical member that would be capable of withstanding the full power of the beam.

The invention utilizes a two component window system. The first component is a cylindrical mirror which diverges the beam from circular to a fan shaped crossection thereby substantially reducing the power density. The second component is a lens-wedge element which acts as the window, sealing the container and transmitting the low power density beam and reforming the beam to its original size without the need of further optics.

It is therefore an object of the invention to provide a new and improved window for high power gas lasers.

It is another object of the invention to provide a new and improved window for high power gas lasers that is easily constructed and low in cost.

It is a further object of the invention to provide a new and improved window for high power gas lasers that is uneffected by changes in environment.

These and other advantages, features and objects of the invention will become more apparent from the following description taken in connection with the illustrative embodiment of the accompanying drawings.

DESCRIPTION OF THE PREFERRED EMBODIMENT

Figure 1:
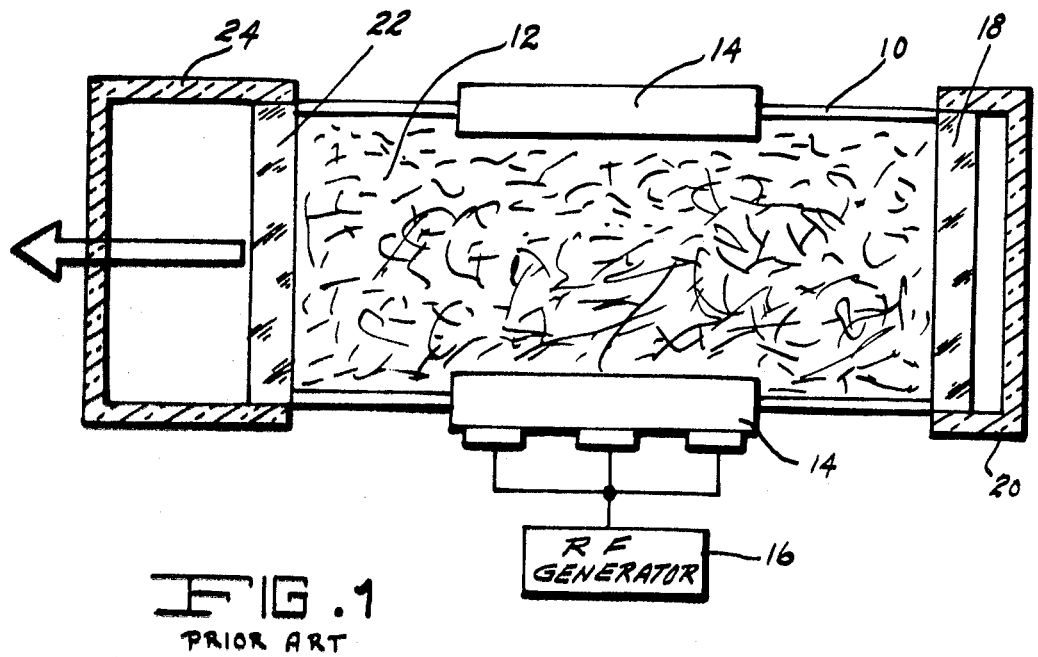
FIG. 1 is a side elevational view, partly in section of a typical gas laser.

Referring now to FIG. 1 there is shown a typical gas laser having a container 10 for holding a gas 12 such as a helium-neon mixture. The gas is excited by electromagnetic energy that is transmitted by the electrodes 14 from the RF generator 16. A mirror 18 and window 20 enclose one end of the structure while a partially reflecting mirror 22 and window 24 enclose the opposite end.

Figure 2:
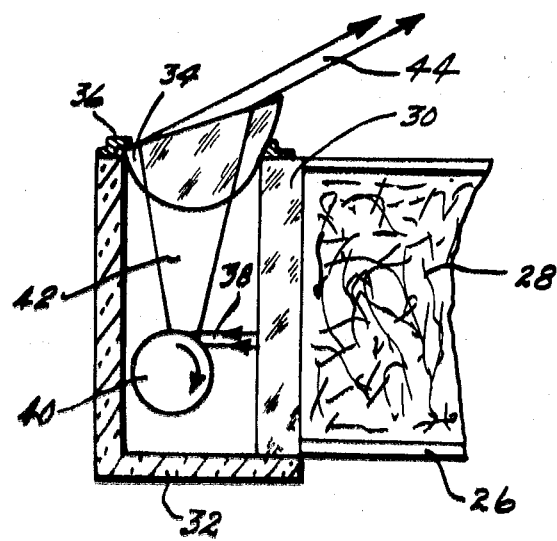
FIG. 2 is a side elevational view of the invention.

As described hereinbefore, lasers having an ultra high power density beam will distort or destroy known window material, as a result the concept of reducing the laser beam density has been put into practice in the novel manner set forth in FIG. 2.

In FIG. 2 there is shown a container 26 filled with a gas 28 having a partially reflecting mirror 30. Supported by an appropriate means 32, is a cylindrical lens 34 that may be constructed of pure germanium or other suitable material. The lens is held in place by the clamp and seal 36. Positioned in the path of the beam 38 is a stainless steel cylindrical mirror 40. The cylinder may be constructed from any appropriate reflective material and likewise may be rotatable to limit the effects caused by heating.

In operation, the gas is excited and caused to lase after which the beam passes through partially reflecting mirror 30 and strikes the cylindrical mirror 40. The beam then diverges and becomes fan shape as shown at 42. The enlarged beam having a lower beam density passes safely through the window. The window being a cylindrical lens causes the beam to be reconstructed at 44 without the need of further optics and with little or no loss in efficiency.

Having thus described a window for ultra high power gas lasers I claim the following as my invention.

1. In an ultra high power gas laser comprising a container, a gas laser medium, pump means coupled to said container for producing a population inversion in the gas laser medium; means for stimulating the emission of radiation from said inverted medium; means for coupling an ultra high energy density beam of said radiation from said medium adjacent one end of said container; means for sealing the opposite end of the container; the improvement comprising: output coupling means sealed to the container at said one end of the container comprising cylindrical mirror means positioned in the path of said beam for forming a divergent reflected beam having a reduced energy density, and a cylindrical lens means sealed to said container for receiving the divergent beam and for reforming the beam to its original energy density exteriorly of said container.

2. A window for ultra high power gaseous lasers according to claim 1 wherein said cylindrical mirror is capable of being rotated.

* * * * *